LANGDON & KELLOGG.
Broom.
No. 32,299.  
Patented May 14, 1861.
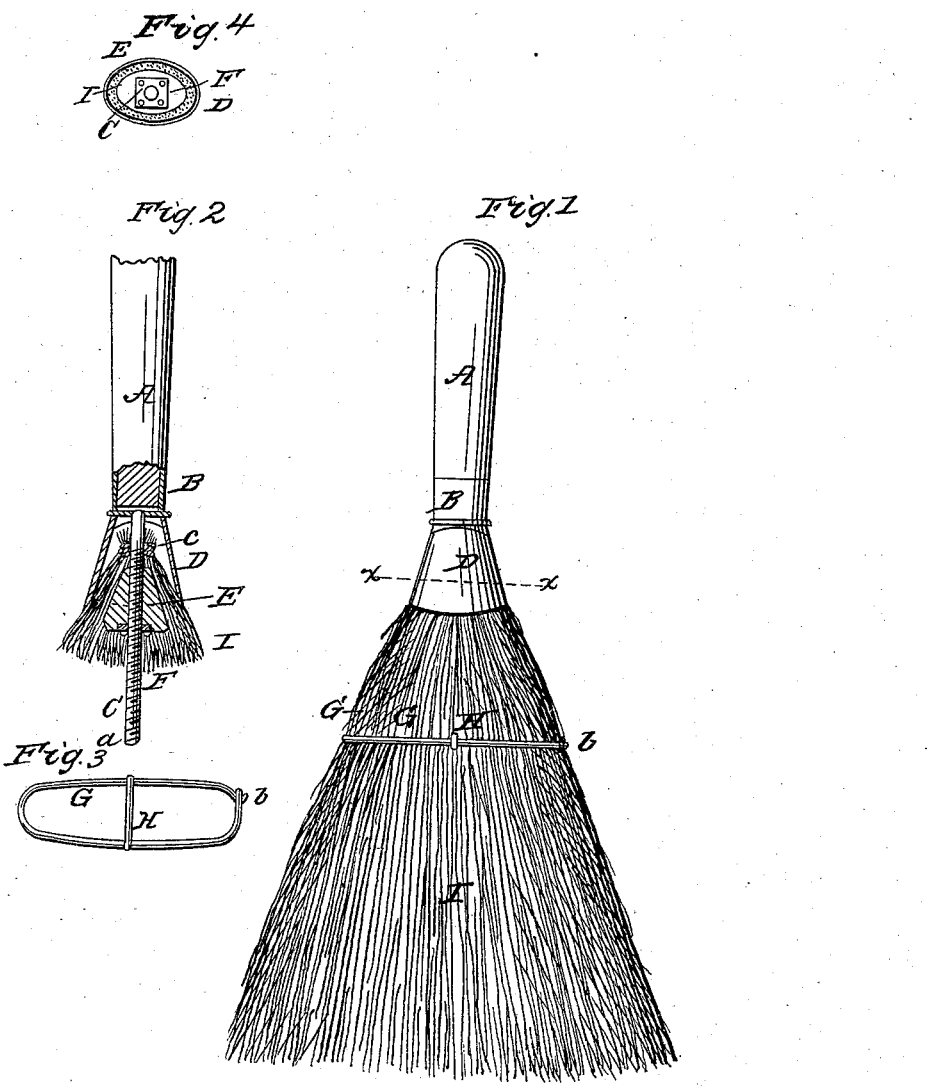

UNITED STATES PATENT OFFICE.

THOMAS LANGDON AND H. C. KELLOGG, OF QUASQUETON, IOWA.

BROOM.

Specification of Letters Patent No. 32,299, dated May 14, 1861.

*To all whom it may concern:*

Be it known that we, THOMAS LANGDON and H. C. KELLOGG, of Quasqueton, in the county of Buchanan and State of Iowa, have invented a new and useful Improvement in Brooms; and we do hereby declare that the following is a full, clear, and exact description of the same, reference being had to the annexed drawings, making a part of this specification, in which—

Figure 1 is an external view of a broom or whisk brush, constructed according to our invention. Fig. 2, a longitudinal central section of the upper part of the same; Fig. 3, a detached view of a clasp pertaining to the same; Fig. 4, a transverse section of the broom, taken in the line $x$, $x$, Fig. 1.

Similar letters of reference indicate corresponding parts in the several figures.

The object of this invention is to obtain a ready and simple means whereby brooms may be manufactured by any one unskilled in the art as at present practiced, and farmers and others who raise broom corn may keep themselves supplied with brooms of their own manufacture at a trifling cost. To this end we dispense entirely with the usual twine and wire binding by which the broom corn is secured to the handle, and employ a screw attached to the handle, and use in connection therewith a wedge, socket and clasp arranged substantially as hereinafter shown and described whereby the broom corn may be attached to the handle very expeditiously and in a very secure manner, and new broom corn readily substituted for old whenever required, the parts above named with the exception of the broom corn lasting indefinitely.

To enable those skilled in the art to fully understand and construct our invention we will proceed to describe it.

A. represents the handle of the broom and B. is a ferrule placed on its lower end. C. is a screw rod which is fitted in the lower end of the handle. The handle may be of wood, the ferrule B. is of metal and also the screw rod C.

D. is a metal cap which may be of oval taper form or of conical form according to the shape it is designed to have the broom. A flat broom is represented in Fig. 1, and consequently the cap D. shown in the drawings is of oval taper form.

E. represents a wooden wedge which approximates in form to the interior of the cap D. but is considerably smaller, see Fig. 2. In the bottom of the wedge E. there is fitted a nut F. through which the screw rod C. passes, the screw rod also passing through the wedge E. as shown in Fig. 2.

The lower end of the screw rod C. has an eye $a$, made in it and G. is a clasp which is formed of a metal rod or wire bent in oval form as shown in Fig. 3. and connected at its ends by a hook and eye as shown at $b$. in Figs. 1 and 3.

H. is a short rod, one end of which is fitted on the clasp loosely and the opposite end made to hook over the opposite side of the clasp, the rod H. passing across the clasp at its center.

I. represents the broom corn the upper part of which is bound to the screw rod C. as shown at $c$. in Fig. 2. The wedge E. is fitted within the upper part of the broom corn and the screw rod C. passed through it, the cap D. being fitted on the top of the broom corn and the lower end of the handle bearing against the top of the cap. The handle A. is then turned and the wedge E. by means of screw rod C. and nut F. is drawn up within the cap D. and the upper part of the broom corn is firmly bound within the cap D. The clasp G. is then fitted to the broom and the rod H. passed through the eye $a$. of the screw rod, the rod H. prevents the screw rod from turning and the clasp retains the broom corn in proper shape.

The screw rod, cap, wedge and clasp may be made and sold to those who desire them. These parts being obtained a broom may be quickly constructed and new broom corn adjusted to the fixtures whenever required, the latter will last indefinitely as they are not subjected to any particular wear.

We do not claim any of the parts separately; but,

We do claim as new and desire to secure by Letters Patent,

1. The employment or use of the wedge E. and screw C. attached to handle A. in combination with the cap D. the above parts being applied to the broom corn I. and all arranged substantially as and for the purpose set forth.

2. In combination with the screw C. wedge E. and cap D. a cross rod H. attached to the clasp G. and passing through the eye $a$, of the screw to prevent the casual turning of the latter as specified.

THOMAS LANGDON.
H. C. KELLOGG.

Witnesses:
E. A. ALEXANDER,
T. A. JERNEGAN.